March 30, 1965 H. SCHREINER 3,175,892

SILICON RECTIFIER

Filed Sept. 19, 1961

United States Patent Office 3,175,892
Patented Mar. 30, 1965

3,175,892

SILICON RECTIFIER

Horst Schreiner, Nurnberg, Germany, assignor to Siemens-Schuckertwerke Aktiengesellschaft, Berlin-Siemensstadt, Germany, a corporation of Germany Filed Sept. 19, 1961, Ser. No. 139,244
Claims priority, application Germany, Sept. 21, 1960, S 70,453
12 Claims. (Cl. 29—195)

My invention concerns rectifiers and related, essentially rectifying, semiconductor devices of silicon, and in another, more particular aspect to silicon power rectifiers that are subjected to elevated and varying temperatures when in use.

The contacted areas of the crystalline silicon body in such devices, especially when large-area engagements are involved, are subjected to thermal alternating stresses due to the different thermal coefficients of expansion of the respectively different materials adjacent and bonded to each other. Thus, silicon has a coefficient of expansion greatly different from those of the contacting metals, such as tungsten or molybdenum, and of such carrier metals as copper or silver, as well as of metals which, like iron and brass, are often used for the housing of such rectifier devices. As a result, thermal alternating stresses may thus damage or destroy a rectifier device composed of these different substances.

Various proposals have become known for minimizing the above-mentioned difficulties. According to one of these, silicon rectifiers are provided with carrier plates which consist of a sintered structure of tungsten, molybdenum, or chromium, filled with a good conducting metal. This affords a relatively good adaptation to the thermal expansion coefficient of the silicon body, but not at the junction of the body with the carrier, support or housing if the latter consist of copper or silver, for example.

It is an object of my invention, relating to electronic silicon rectifiers and similarly operating silicon devices, particularly of the type subjected to thermal alternating stresses when in normal operation, to greatly minimize or eliminate thermal stresses and the resulting damage at all endangered places of the silicon body.

To this end, and in accordance with a feature of my invention, I dispose the silicon body symmetrically between two sintered contacting plates consisting of tungsten or (molybdenum)-nickel, or tungsten (molybdenum)-gold-nickel, and I join the two sintered plate structures with the silicon body by soldering or brazing with gold. The soldering on one side of the silicon body can be effected with the aid of a foil consisting of a gold-boron alloy, and on the other side with the aid of a foil consisting of a gold-antimony alloy. In this case, the joining of the sintered contact plates with the silicon body and with the respective current leads cannot only be effected in a single stage of operation, but the same operation will also cause doping of the silicon body in known manner with boron and antimony respectively from the two above-mentioned foils in accordance with the alloying method.

Particularly suitable for the sinter-contact plates are compositions of 80 to 99% tungsten, 0 to 10% gold and 0.2 to 10% nickel; or 70 to 99% molybdenum, 0 to 10% gold and 0.2 to 20% nickel, all percentages herein given being by weight. Preferably used for this purpose is tungsten or molybdenum powder in a grain size below 10 microns ($\mu$), containing at least 10% grains of a size below 1$\mu$. The powder mixture can also be obtained by simultaneously precipitating all three components from a solution and by reduction of the precipitataing powder to form the metal powder.

For improving the soldering qualities, the sintered contact plates according to the invention can be provided on one side with a thin nickel coating and/or silver coating; and/or they may be provided on the other side with a thin gold coating, the thickness of each coating being, for example, in the order of magnitude of 1$\mu$.

Embodiments of the invention will be described presently with reference to the drawing in which.

Figure 3:
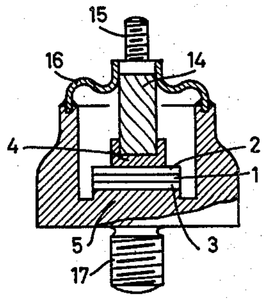
FIG. 3 is a cross section through a silicon rectifier joined with its protective housing and terminal structures.

In all three illustrations, the silicon body is denoted by 1, the two contact plates are denoted by 2 and 3 respectively, and the current supply terminals are denoted by 4 and 5. In the illustrated embodiment the terminals 4 and 5 are also designed as plate-shaped structures consisting for example, of copper. According to FIG. 3, showing a complete power rectifier, the terminal 4 is connected by a short piece of copper cable 14, with a terminal bolt 15, and the terminal plate 5 forms part of a protective housing with which the bolt 15 is resiliently connected at 16 by a flexible member insulated from the housing. The housing has an integral connecting bolt 17 which serves as a current supply lead and also for fastening the rectifier to a support or heat sink.

Figure 1:
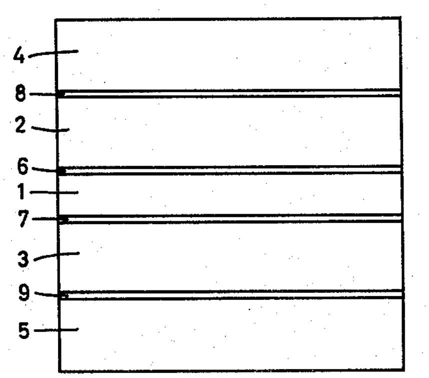
FIG. 1 shows schematically the stratified design of a silicon rectifier according to the invention.

Further shown in FIG. 1 at 6, 7, 8, and 9 are respective layers of solder material. The layers 6 and 7 consist, for example, of a gold-boron foil and a gold-antimony foil, respectively. Each foil may contain about 1% boron or antimony, the remainder being gold. Suitable for layers 8 and 9 is hard solder, such as silver.

Figure 2:
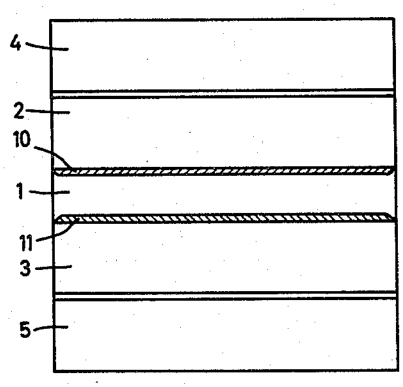
FIG. 2 shows schematically the design of the same rectifier in final condition.

FIG. 2 schematically illustrates the alloy layers which result from doping. These layers are denoted by 10 and 11. It will be understood that the presentation in FIGS. 1 and 2 is explanatory but does not represent actual proportions. For example, in reality, the illustrated strata may have the following approximate thickness values: Layer 1, 0.2 mm.; layers 2 and 3, 2 mm. each; layers 4 and 5, 5 mm. each (the thickness of layers 4 and 5 can be varied to any desirable extent); layers 6 and 7, 0.04 mm. each; layers 8 and 9, 0.1 mm. each; layers 10 and 11, 0.06 mm. each.

The sintered contact plates should not contain any foreign metals or detrimental impurities which during the alloying operation may diffuse through the alloy layers into the silicon and thus impair the conductance mechanism.

The method of producing the rectifier according to the invention will be described with reference to the following specific examples.

*Example 1*

For producing sinter-contact plates from tungsten-gold-nickel in a composition of 98:1:1% by weight, corresponding quantities of metal powder, having a grain size of 0.06 mm., are intimately mixed. The mixture is pre-shaped and then pressed at a molding pressure of 3 t./cm.$^2$ (t.=metric ton). This results in a compressing density of 10.7 g./cm.$^3$. The shaped body is subsequently sintered for one hour at 1400° C., in a hydrogen atmosphere. This results in a sintering density of 18.55 g./cm.$^3$, corresponding to a space-filling degree of 97%. Consequently, the contact plates possess only slight porosity which, however, suffices for considerably wetting of the surface by the solder and thus affords good soldering qualities. As mentioned above, these qualities can be further improved by adding thin coatings of nickel or gold. The nickel coating can be deposited during the pressing operation. Such a coating can be produced particularly by brushing or painting it upon the pressed or sintered body in form of a sludge consisting of carbonyl-nickel powder (grain size from less than 1$\mu$ up to 5$\mu$), silver powder or gold powder (grain size below 1$\mu$) mixed with a binding agent, for example ethylene glycol diluted with ethyl alcohol. When thus painting the coating material upon the pressed body, the sintering of the contact plate and the sintering of the nickel coating resulting in adhesion of the coating, take place simultaneously. However, when the coating material is deposited upon the previously sintered body, the body must be subjected to another heat treatment in order to produce the metal coating and bonding it with the sinter body. This treatment is effected at about 1300° C. for a nickel coating, at about 900° C. for a silver coating, and at 1100° C. for a gold coating, each time in a hydrogen atmosphere. In a corresponding manner, a gold coating can be applied to the other side of the plate, for example by brushing a gold sludge upon the sinter body; adhesion of the coating is then obtained by heat treatment for 5 minutes at 1100° C. in a hydrogen atmosphere.

*Example 2*

For preparing a sintered contact plate of molybdenum-nickel in a composition of 95:5% by weight, the corresponding quantities of metal powder, in a grain size below 0.06 mm., are intimately mixed and then pressed at 2 t./cm.$^2$. The density of the pressed body is 5.73 g./cm.$^3$, corresponding to a space-filling degree of 0.564. Sintering for one hour at 1300° C. in a hydrogen atmosphere results in a sintered structure of 9.96 g./cm.$^3$ density, corresponding to a space-filling degree of 0.985. The nickel-silver coating or gold coating can be applied in the same manner as described above for Example 1.

For completing the silicon rectifier, the layer sequence shown for example in FIG. 1 is prepared, and the alloying and simultaneous soldering operation is performed at a temperature between 700 and 900° C. For joining layers 2 and 4, as well as layers 3 and 5, a solder suitable for the just mentioned temperature range is chosen. This solder may consist of hard solder material.

As mentioned above, an essential advantage of the method is the fact that it requires only one heat treatment. This applies also if the current-supply components are given different shapes. Furthermore, the rectifier is of extremely low sensitivity not only to thermal alternating stresses, but also with respect to mechanical forces that might otherwise cause breaking. This is mainly due to the symmetrical arrangement of the contact plates. For these reasons, the rectifier according to the invention satisfies particularly exacting requirements in mechanical as well as thermal respects.

I claim:

1. In a silicon rectifier having a silicon body and two plates symmetrically contacting the body on respectively opposite sides thereof in face-to-face engagement therewith, each of said two plates consisting substantially of a sintered and porous structure consisting of a major metal component selected from the group consisting of tungsten and molybdenum, and a nickel component, said structures being substantially 70 to 99% of a metal selected from said group and 0.2 to 20% nickel, and a gold solder bond joining said silicon body with said two sintered structures.

2. In a silicon rectifier having a silicon body and two plates symmetrically contacting the body on respectively opposite sides thereof in face-to-face engagement therewith, each of said two plates consisting substantially of a sintered porous structure consisting of a major metal component selected from the group consisting of tungsten and molybdenum, and a nickel component, said structures being substantially 70 to 99% of a metal selected from said group and 0.2 to 20% nickel, and a gold solder bond joining said silicon body with said two sintered plate structures.

3. In a silicon rectifier having a silicon body and two plates symmetrically contacting the body on respectively opposite sides thereof in face-to-face engagement therewith, each of said two plates consisting substantially of a porous sintered structure consisting of a major metal component selected from the group consisting of tungsten and molybdenum, and a nickel component, said structures being substantially 70 to 99% of a metal selected from said group and 0.2 to 20% nickel, a fusion layer of boron-containing gold bonding said silicon body with one of said sintered plates, and a fusion layer of gold-antimony alloy bonding said silicon body with said other sintered plate.

4. In a silicon rectifier having a silicon body and two plates symmetrically contacting the body on respectively opposite sides thereof in face-to-face engagement therewith, each of said two plates consisting of a sintered porous structure formed substantially of 80 to 99% of tungsten, 0.2 to 10% of nickel and up to 10% of gold, and gold solder joining each of said sintered plates with said silicon body.

5. In a silicon rectifier having a silicon body and two plates of a sintered porous structure symmetrically contacting the body on respectively opposite sides thereof in face-to-face engagement therewith, each of said two plates consisting substantially of 70 to 99% of molybdenum, 0.2 to 20% of nickel and up to 10% of gold, and gold solder joining each of said sintered plates with said silicon body.

6. The method of producing a silicon rectifier composed of a silicon body and two contact plates in face-to-face relation to the silicon body on respective opposite sides thereof, which comprises producing each contact plate from a mixture of metal powder consisting substantially of a major metal component selected from the group consisting of tungsten and molybdenum, and a nickel component, said structures being substantially 70 to 99% of a metal selected from said group and 0.2 to 20% nickel, the powder of metal selected from said group having a grain size below 10 microns with at least 10% by weight having a size below one micron; pressing and sintering said mixture to produce rigid porous structures; and bonding each structure to said silicon body by soldering with gold.

7. The method of producing a silicon rectifier composed of a silicon body and two contact plates in face-to-face relation to the silicon body on respective opposite sides thereof, which comprises producing each contact plate from a mixture of metal powder consisting of 0.2 to 10% of nickel and 80 to 99% of a metal selected from the group consisting of tungsten and molybdenum with up to 10% gold, the powder of metal selected from said group having a grain size below 10 microns with at least 10% by weight having a size below one micron, and said nickel and gold powders having a grain size below 1 micron; pressing and sintering said mixture to produce rigid porous structures; and bonding each structure to said silicon body by soldering with gold.

8. The method of producing a silicon rectifier according to claim 6, which comprises the antecedent step of jointly precipitating the component metal powders of the mixture from a solution.

9. The method of producing a silicon rectifier according to claim 6, which comprises coating one side of the sintered structure prior to soldering with metal from the group consisting of nickel and silver so as to provide the internally porous structure with a dense surface of said latter metal.

10. The method of producing a silicon rectifier according to claim 6, which comprises coating one side of the sintered structure with gold prior to soldering so as to provide the internally porous structure with a dense surface of said latter metal.

11. The method of producing a silicon rectifier according to claim 6, which comprises coating one side of the sintered structure prior to soldering with metal from the group consisting of nickel and silver; and coating the other side of said structure with gold prior to soldering so as to provide the internally porous structure with dense surfaces.

12. The method of producing a silicon rectifier composed of a silicon body and two contact plates in face-to-face relation to the silicon body on respective opposite sides thereof, which comprises producing each contact plate from a mixture of metal powder consisting substantially of a major metal component selected from the group consisting of tungsten and molybdenum, and a nickel component, said structure being substantially 70 to 99% of a metal selected from said group and 0.2 to 20% nickel, the powder of metal selected from said group having a grain size below 10 microns with at least 10% by weight having a size below one micron; pressing and sintering said mixture to produce rigid porous plate structures, placing a boron-containing gold foil between said silicon body and one of said sintered structures, placing an antimony-containing gold foil between said body and said other structure; and heating the entire assembly to alloying temperature to solder said plates to said body and simultaneously dope said body with boron and antimony from said respective foils.

References Cited by the Examiner

UNITED STATES PATENTS

| | | | |
|---|---|---|---|
| 2,856,681 | 10/58 | Lacy | 29—504 X |
| 2,971,251 | 2/61 | Willemse | 29—195 |
| 3,009,840 | 11/61 | Emeis | 148—184 |
| 3,050,667 | 8/62 | Emeis | 317—240 |

DAVID L. RECK, *Primary Examiner.*

HYLAND BIZOT, *Examiner.*